Nov. 11, 1952 H. E. GRAU 2,617,292
CONTINUOUS TUBE TESTING APPARATUS
Filed April 24, 1948 7 Sheets-Sheet 2

Fig. 1b.

Inventor
HERMAN E. GRAU
By J. E. Dickinson
Attorney

Nov. 11, 1952 H. E. GRAU 2,617,292
CONTINUOUS TUBE TESTING APPARATUS
Filed April 24, 1948 7 Sheets-Sheet 3

Inventor
HERMAN E. GRAU
By J.E. Dickinson
Attorney

Nov. 11, 1952   H. E. GRAU   2,617,292
CONTINUOUS TUBE TESTING APPARATUS
Filed April 24, 1948   7 Sheets-Sheet 5

Inventor
HERMAN E. GRAU
BY J. E. Dickinson
Attorney

Nov. 11, 1952  H. E. GRAU  2,617,292
CONTINUOUS TUBE TESTING APPARATUS
Filed April 24, 1948  7 Sheets-Sheet 7

Fig. 11.

Inventor
HERMAN E. GRAU
By J. E. Dickinson
Attorney

Patented Nov. 11, 1952

2,617,292

UNITED STATES PATENT OFFICE 2,617,292

CONTINUOUS TUBE TESTING APPARATUS

Herman E. Grau, Mount Lebanon, Pa., assignor to United Engineering & Foundry Company, Pittsburgh, Pa., a corporation of Pennsylvania Application April 24, 1948, Serial No. 23,117

8 Claims. (Cl. 73—44)

This invention relates to a testing device and in particular to apparatus for testing tubes of various lengths and diameters continuously supplied thereto from an adjacent loading table, the term "tubes" as employed herein being used in the generic sense to include pipes as well as all other elongated hollow objects of a like construction.

Heretofore, apparatus employing a fluid under pressure for testing tubes in order to discover leaks, defective welds and the like therein has been very inefficient, since the steps of positioning, pre-filling, testing and ejecting must be effected for each unit tested before the next succeeding one can be accommodated. As a result, considerable loss of time is experienced so that the number of tubes tested over a given period of time is quite small.

With apparatus of the type herein disclosed, it is unnecessary to defer the preliminary operations of positioning and pre-filling the next succeeding tubes to be tested until the previous one has completely passed through the testing cycle. Hence, no delay is involved, since the various testing stages are carried out concurrently, depending upon the positions of the tubes simultaneously engaged by and passing through the apparatus. Being an automatic testing unit, having a water receiving pit or sump therebeneath, cooperating with a loading table adjacent thereto and a gate at the discharge side thereof, associated with a receiving bin, to separate the perfect from the defective specimens, this apparatus eliminates all handling of the tubes from the time they are placed upon the loading table until they are ejected from the apparatus and received in the bin at the discharge side. Inasmuch as groups of tubes to be tested may be of different commercial lengths and diameters, the apparatus can be positively and readily adjusted to accommodate the various sizes.

It is one object of this invention to provide apparatus for testing tubes continuously received from an adjacent loading table or the like, the various steps of positioning, pre-filling, testing and ejecting the units being carried out simultaneously depending upon the respective positions of each of the several units passing through the apparatus.

Another object of this invention is to provide tube testing apparatus which is positive and efficient in operation, requiring the services of but one attendant for carrying out the testing procedure.

Still another object of this invention is to provide tube testing apparatus which is compact and relatively simple to operate as well as economical to construct and maintain.

These objects, as well as the various other novel features and advantages of this invention, will become apparent from the following description and accompanying drawings of which:

Fig. 2 is an end elevation view taken at II—II of Fig. 1a, Fig. 3 is an end elevation view taken at III—III of Fig. 1b, Fig. 4 is an enlarged view of one of the tube engaging and positioning adjustable spiders and elements associated therewith taken at IV—IV of Fig. 1a, Fig. 5 is a detail view of one of the adjustable spiders, Fig. 6 is a detail sectional view taken at VI—VI of Fig. 5.

Figure 1A:
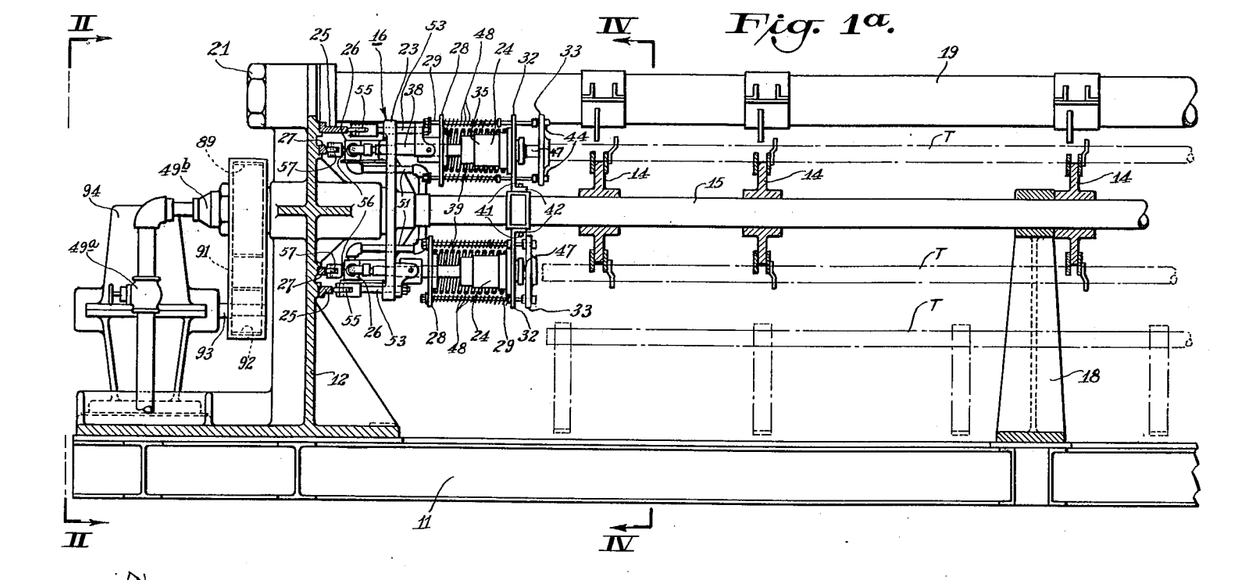
Figs. 1a and 1b constitute together a side elevation, partly in section, of a continuous tube testing apparatus embodying the features of my invention.
Figure 1B:
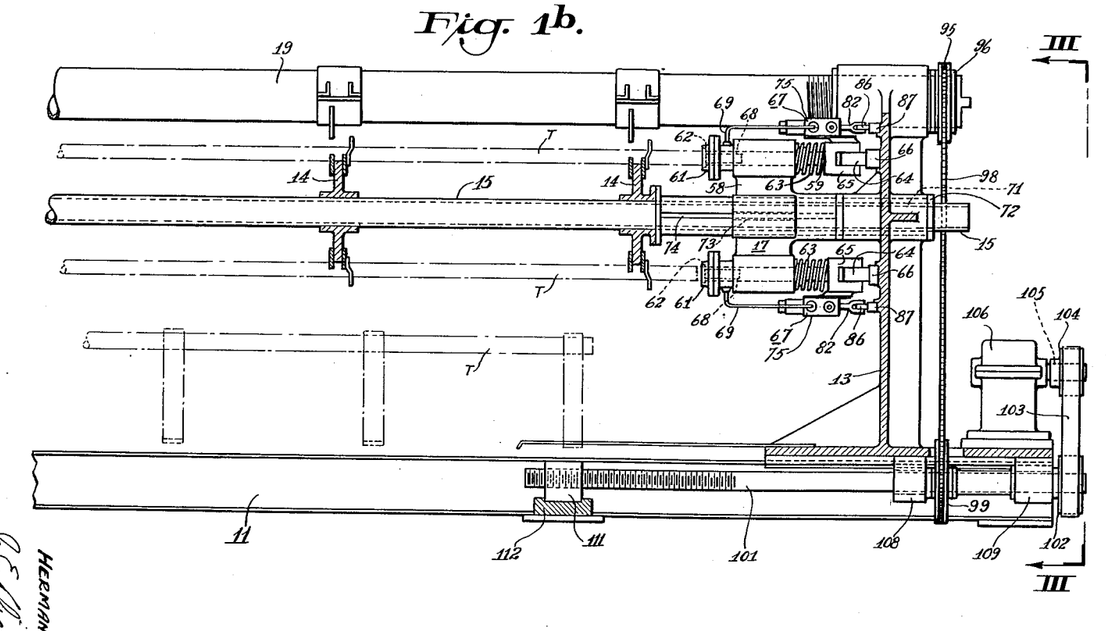

With reference to the drawings Figs. 1a and 1b, the continuous tube testing apparatus illustrated therein comprises a base 11 upon which are supported a head stock frame 12 and a longitudinally adjustable tail stock frame 13 between which tubing is adapted to be positioned by means of a plurality of adjustable tube engaging devices 14 spaced along and rotated by a hollow shaft 15 upon which shaft is also mounted for rotation thereby the head stock assembly 16 and tail stock assembly 17. A pedestal bearing 18 secured to the base 11 is provided for supporting the shaft 15 intermediate the ends thereof. A pair of hollow rods 19, for supporting and insuring parallelism between the two end frames, are secured at one end to the head stock frame 12 by means of nuts 21 and slidably received at their opposite ends within bearings 22 provided in the longitudinally adjustable tail stock frame 13.

Figures 7, 8:
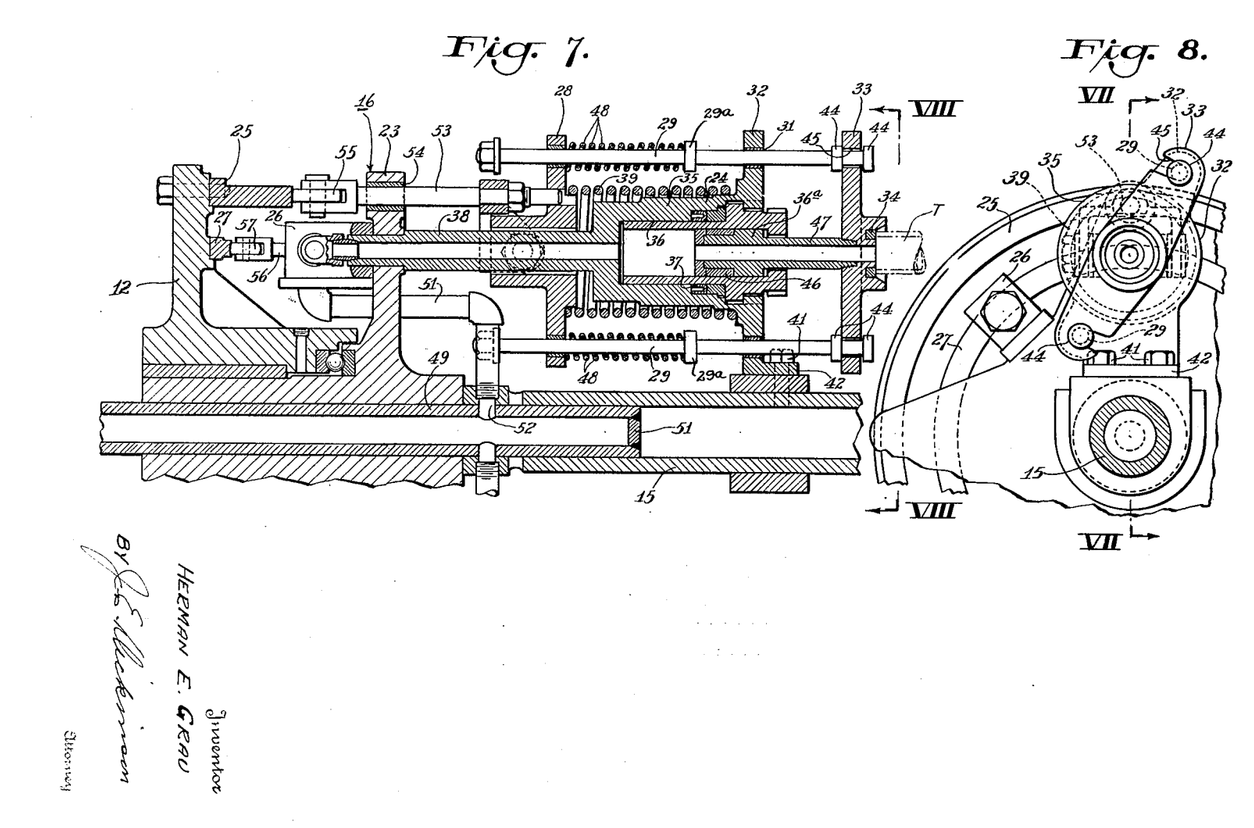
Fig. 7 is a detail sectional view taken at VII—VII of Fig. 8.
Fig. 8 is an end elevation view taken at VIII—VIII of Fig. 7.

The head stock assembly 16 comprises a carrier disc 23 upon which are secured a plurality of rotatable sealing heads 24, actuated by a cam ring 25 secured to frame 12, and a plurality of valves 26 associated with the sealing heads and actuated by a second cam ring 27 also attached to the frame 12. As shown in Figs. 7 and 8, each of the sealing heads 24 includes a reciprocable end plate 28 to which is secured a pair of guide rods 29, provided with collars 29a intermediate the ends thereof, slidable within openings 31 of a flange 32 and attached to a sealing pad 33 within which a resilient sealing ring 34 is secured. Cylinder 35, of which the flange 32 is an integral part, is provided with a second cylinder 36 firmly affixed therein and sealed by means of a suitable packing 37 so that leakage between the two cylinders is prevented. At the bottom of and integral with the cylinder 35 is a hollow extended portion 38 secured to the carrier disc 23 and having mounted at the end for communicating with the cylinder 36 one of the valves 26 adapted to be actuated by the inner cam ring 27. A compression spring 39, encircling cylinder 35, constantly urges the end plate 28 away from the cylinder 35, which cylinder is affixed to the hollow shaft 15 by a stud 41 passing through a lug 42 at one edge of the flange 32. The ends of the rods 29 are necked down to provide two shoulders 44 between which the hooks 45 of the sealing pad 33 can be engaged with the rods 29 for securing the pad thereto. A hollow piston 36a, with a seal 46 at the base thereof, is reciprocably confined within cylinder 36 and the hollow piston rod 47 thereof threadably attached to the sealing pad 33. Each of the rods 29 is also provided with an encircling spring 48 adapted to be compressed between the collar 29a and the end plate 28 when the sealing pad 33 is pressed against the end of a tube to be tested. Within the hollow shaft 15, at the head end of the apparatus, is a hollow sleeve 49, which is rotatable integrally with shaft 15 and adapted to carry testing fluid under pressure from a source, not shown, through a hydraulic system comprising a valve 49a and coupling 49b to which the sleeve 49 is rotatably secured. Piping 51, connected to the shaft 15 and sleeve 49 at the openings 52, communicates with and is secured to each of the valves 26 for providing a passage for the fluid from the sleeve 49 to the valves. To each of the end plates 28 is secured a stem 53, slidable within a bushing 54 of carrier disc 23, having a cam follower 55 rotatably secured to the end thereof adapted to be reciprocated by the outer cam ring 25 upon the traverse thereof. To the stem 56 of valve 26 is also rotatably secured a cam follower 57 engaged by the inner cam ring 27 for reciprocating stem 56 to open and close the valve 26.

The tail stock assembly 17 (Fig. 1b) comprises a cruciform-shaped element 58 through which pass the hollow shafts 15 and the reciprocable sealing pad stems 59 having secured to one end thereof sealing pads 61 with resilient sealing elements 62 contained therein, and to the opposite ends brackets 65 to which are rotatably secured cam followers 64. Each of the stems 59 is encircled by a compression spring 63 adapted to be compressed by the action of the cam follower 64 when follower passes over an inner cam ring 66 attached to the adjustable frame 13. A purge valve 67, slidably secured in guides 67a to each of the brackets 65, communicates with the bored-out portion 68 of the stem 59 through a longitudinally extending slotted opening 60a in the hub 60 to which it is attached by piping 69 through which air, entrapped in the tubing being tested, may pass to the valve 67 for purging to the atmosphere. Extending along the shaft 15 and forming an integral part of element 58 is a sleeve 71, which passes through the stock frame 13, having secured thereto a retaining ring 72 for preventing relative longitudinal movement between the element 58 and the frame 13. A key 73, secured within the element 58, is slidably received within a key way 74 formed on the surface of the shaft 15, thus providing a driving connection with the shaft 15 and yet permitting longitudinal movement of the element 58, together with the frame 13, along and relative to the shaft.

Figure 10:
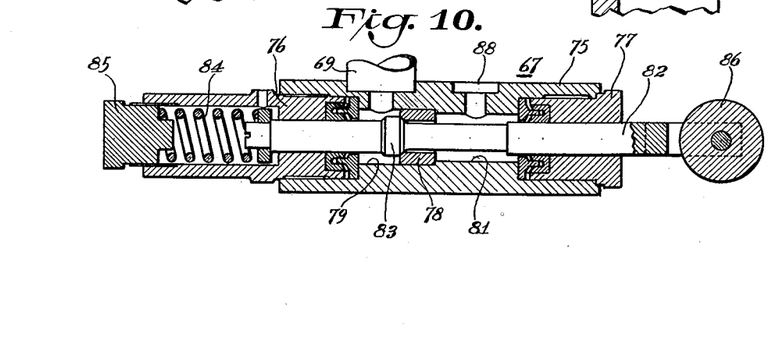
Fig. 10 is a sectional view of the purge valve taken at X—X of Fig. 9

The valve 67 comprises a casing 75, heads 76 and 77 attached thereto, a valve seat 78 positioned within casing 75 forming two chambers 79 and 81, and a valve stem 82, with a valve element 83 formed thereon. At one end of the stem is a compression spring 84 adapted to be compressed between the steam and a spring retaining cap 85 when the stem 82 is moved to the purging position by action of a cam follower 86 secured thereto, as the follower 86 traverses an outer cam ring 87. As will be noted in Fig. 10, when the stem is moved to the purging position, the valve seat 78 becomes uncovered to provide a free passage from the tubing 69 to the atmosphere through the chambers 79 and 81 and the port 88 in the side of the casing 75.

The driving system for rotating shaft 15 and the elements connected thereto comprises a pulley 89 keyed to shaft 15 over which passes a belt 91 to a second pulley 92 keyed to the output shaft 93 of a gear reduction unit 94 driven by an electrical motor or the like, not shown.

Figures 2, 3, 4:
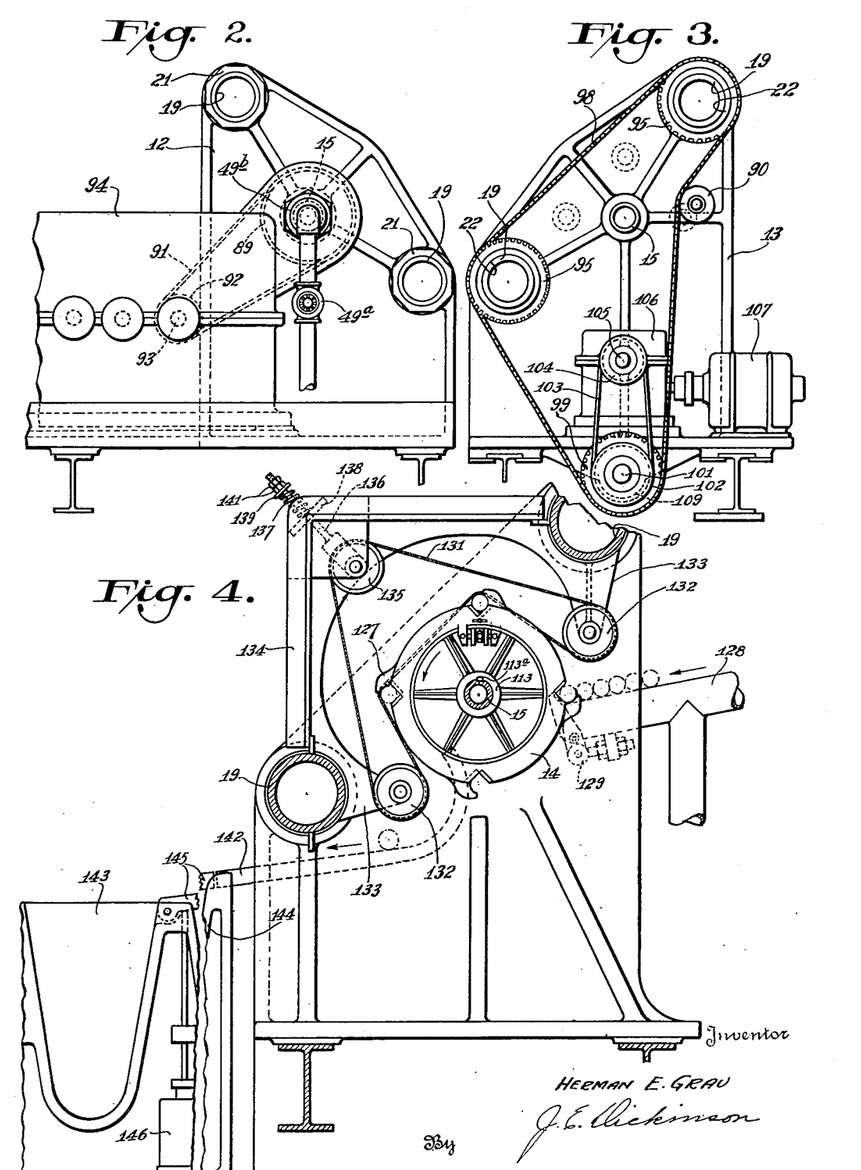
Figure 9:
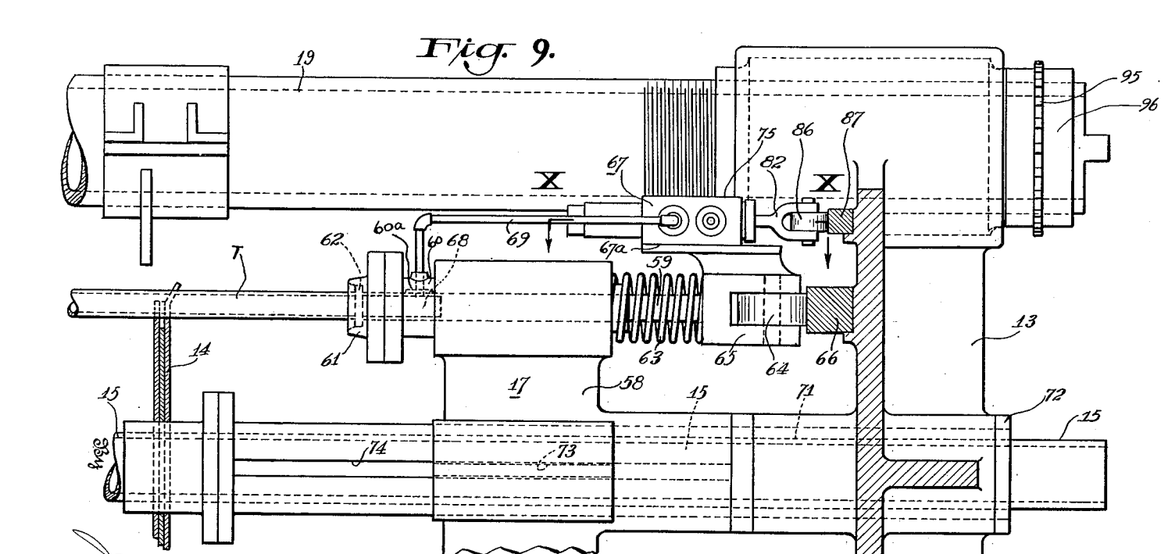
Fig. 9 is an enlarged view of the assembly of one of the purge valves provided at the tail stock end of the apparatus.

For adjusting the tail stock frame 13 and the members supported thereby, there are provided two sprockets 95 secured to threaded sleeves 96 rotatably confined within the openings in the frames 13 and in threaded arrangement with the rods 19, as shown in Figs. 3 and 9, so that upon rotation of the sleeves 96 the frame will be caused to move along shaft 15 to any desired position. A continuous chain 98, with a tensioning roller 90 provided therefor, passes over the sprockets 95 and around a driven sprocket 99 attached to a shaft 101, at the end of which shaft is mounted a pulley 102 engaged by a belt 103 driven from a second pulley 104 keyed to the output shaft 105 of the gear drive unit 106 which is powered by an electrical motor 107 secured to the base of the frame 13. The shaft 101, threaded for a substantial portion of its length, is confined within suitable bearings 108 and 109, attached to the underside of the base of frame 13, and is threadably engaged by a nut 111, firmly affixed to the foundation 11 by means of a cross member 112, so that when the shaft 101 is rotated, it assists in moving the frame 13 longitudinally of the tube testing drive shaft 15.

Figures 5, 6:
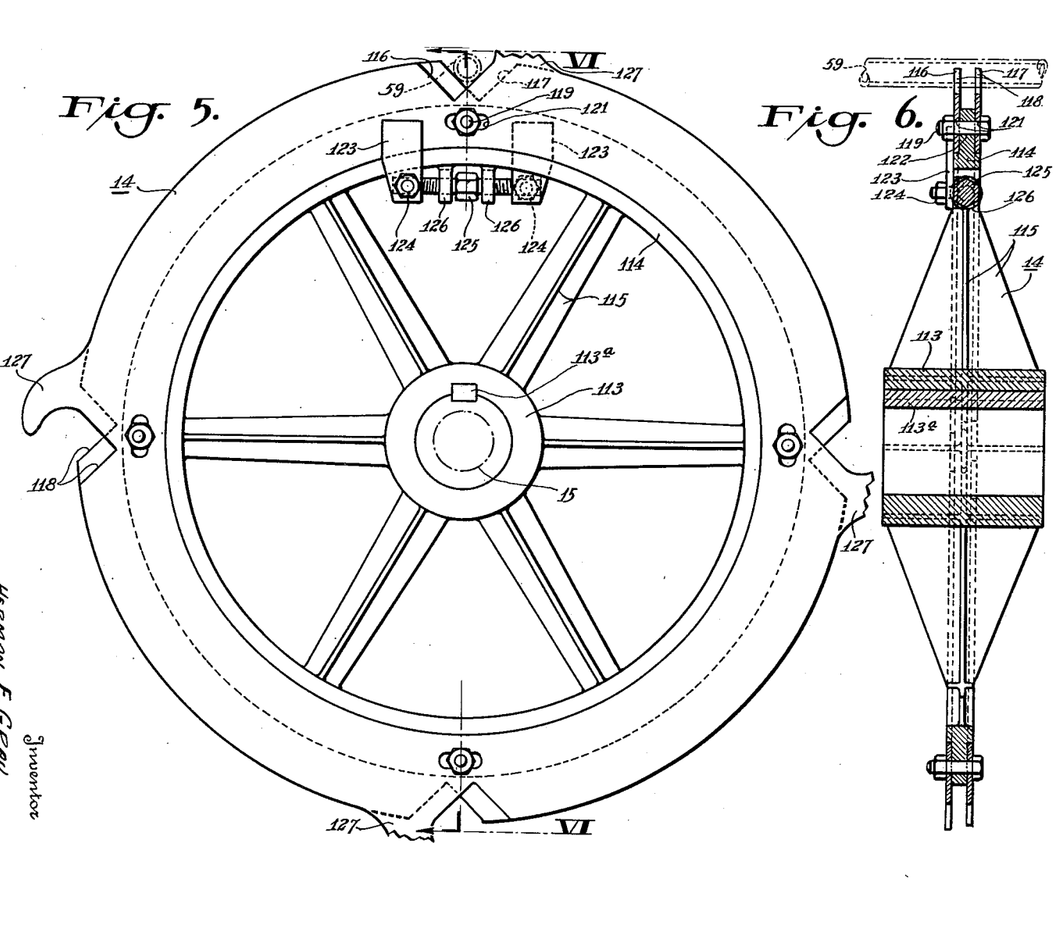

As shown in Figs. 4, 5 and 6, each of the adjustable tube engaging spiders 14 comprises a hub 113, provided with a key 113a for engaging with a keyway in shaft 15 in order to affix the spider thereto, a rim 114 joined to the hub by spokes 115 welded thereto, and two movable rings 116 and 117, having a plurality of notches 118 at the peripheries thereof, secured to opposite sides of the rim by bolts 119 passing through slotted openings 121 in each of the rings and through holes 122 in the rim. For moving one of the rings relative to the other, in order to increase or decrease the size of the V formed by the notches so as to maintain the axis of a tube placed therein at a common level, regardless of the tube diameter, corresponding with that of the axis of the sealing pads of both the head and tail stock assemblies, there is provided an adjusting means comprising two lugs 123, one welded to each of the rings 116 and 117, each having a nut 124 secured to the ends thereof in threaded engagement with a rotatable right and left hand threaded stud 125 supported by two inwardly projecting elements 126 secured to the hub 113.

A plurality of hook-shaped projections 127 extending outwardly from the ring 116 at the notches thereof are, upon rotation of the spiders, adapted to engage with one of the forward lying tubes on the feed table 128, placed adjacent to the apparatus, for carrying the tube through the testing stages. An adjustable stop 129, pivotally mounted on the feed table at the end adjacent to the testing apparatus, insures that but one tube at a time will be engaged by the hooks and fed into the apparatus. For firmly pressing the tubes within the notches of the spiders during the testing thereof, a continuous cable 131 is provided adjacent each spider which passes over pulleys 132 rotatably mounted on brackets 133 secured to a frame 134 and clamped to rods 19, and over a pulley 135 rotatably secured to a rod 136. Encircling rod 136 is a compression spring 137, retained in position on the rod by a plate 138 welded to the frame and by a washer 139 secured to the rod by lock-nuts 141, which is adapted to yield to the tightening action of the cable 131 when the cable is in engagement with one or more tubes passing through the apparatus.

At the delivery side of and spaced at intervals along the tube testing apparatus there are a number of outward and downward extending skids 142 for receiving tubing, issuing from the apparatus upon the completion of the testing thereof, to be directed either to a prime tube receiving bin 143 or to a defective tube receiving bin 144. Several gates 145, extending across and pivotally connected to bin 144, are adapted to be raised by means of a hydraulic motor 146 in order to permit tubing which is defective to drop into the bin 144 for disposal.

The preferred embodiment of my invention having been described in detail, operation thereof may be briefly summarized as follows:

Depending upon the size of the tubing placed upon table 128 for testing, the spiders 14 are adjusted to insure that the V notches thereof are of the proper size, the stop 129 set so that but one tube at a time will be selected from the table by the hooks 127, the adjustable tail stock frame 13 moved to the proper location determined by the length of the tubing to be accommodated, and the valve 49a opened for admitting fluid to the sleeve 49 within the hollow shaft 15.

Figure 11:
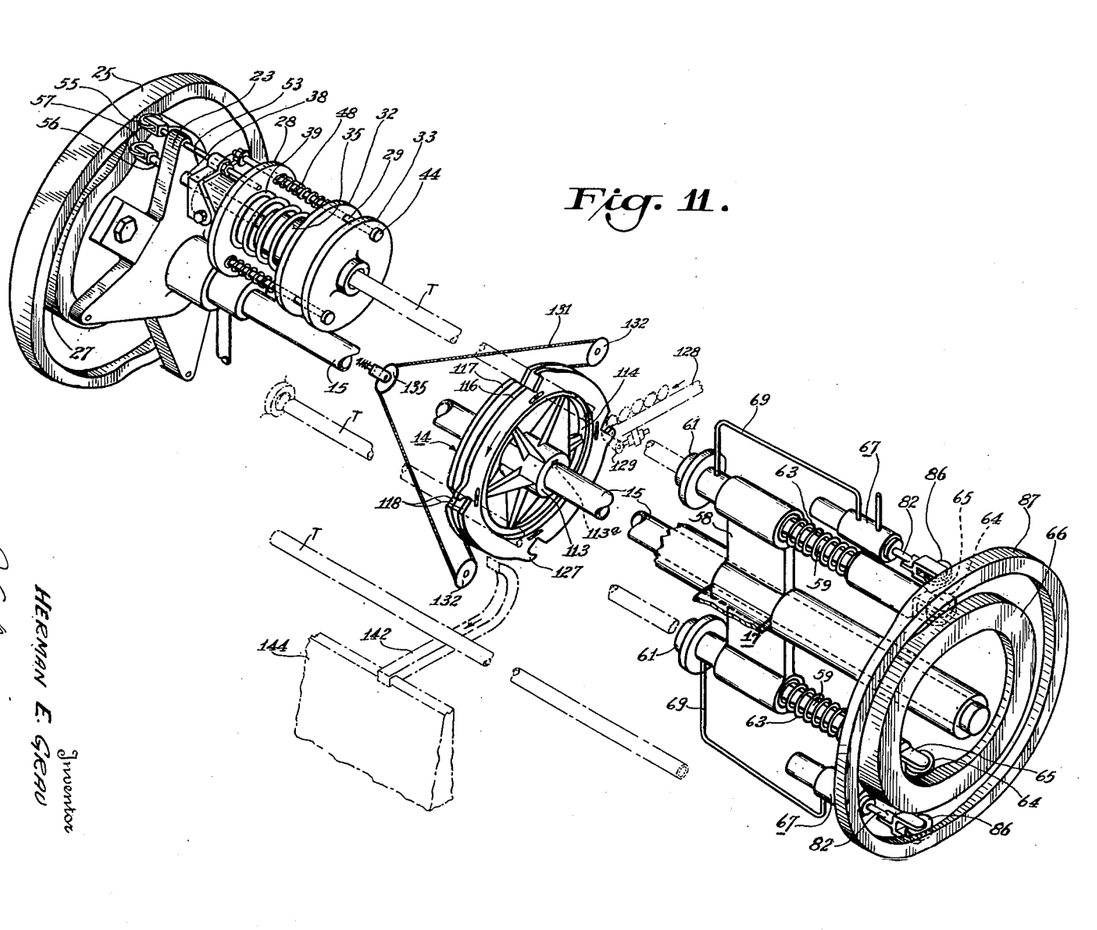
Fig. 11 is a partial isometric view of the testing apparatus illustrating the passage of tubing therethrough.

Shaft 15 is then rotated by actuating the gear drive unit 94 by means of an electrical motor or the like connected thereto, whereby the hooks 127 of spiders 14 are brought into engagement with the first tube on the table 128, and the tube gripped firmly between the cables 131 and spiders 14 and carried into the testing position between head stock assembly 16 and tail stock assembly 17. As specifically shown on the drawing, Figure 11, the two sealing pads 33 and 61 provided on the head and tail stock assemblies respectively are caused to come into engagement with and seal the ends of the tube when the two followers 55 and 64 rise to the top of the two cams 25 and 66 respectively associated therewith. On completion of the sealing action, fluid under pressure is admitted to the tubing thus sealed between the two pads by the opening of valve 26 caused when the follower 57 rises to the crest of cam 27. As soon as the air has been purged from the tube through the purge valve 67 and the tube filled with testing fluid, the valve 67 is closed by the action of follower 86 connected to the stem 82 thereof in passing from the crest to the trough of the cam 87 with which it is associated. For a given length of time, depending upon the predetermined speed of rotation of shaft 15, fluid under pressure is permitted to act on the tube thus sealed between the two heads and released finally at the end of the testing period thereof by the closing of valve 26 as the cam follower 57 passes from the high to the low position of cam 27. In those cases where unusually high testing pressures are to be applied, and in order to avoid having the testing fluids spray from the head stock sealing pads on starting up the apparatus, the valve 49a is not opened until there are tubes in each of the testing stations. With care, the operator can apply the test pressure at the proper instant so that although the air may not be completely purged from the first tube, the test pressure will be applied for the correct length of time to satisfy the operator that the first tube is either prime or defective.

The cams are so arranged that immediately following the closing of valve 26, cam followers 55 and 64 pass to the low points of the cams 25 and 66 respectively, whereby the two sealing pads 33 and 61 are withdrawn from the ends of the tube thereby to cause the tube to be released from between the two testing heads. The spiders 14 continue to rotate and carry the tube downward, and as the gripping cables pass over pulleys 132, the tube is released from within the V notches and deposited on the skids 142. If the tube thus tested is prime, then it will be permitted to pass to the prime tubing receiving bin 143, but if the tubing proves to be defective, then, as it passes from the testing apparatus to the skids 142, the operator will actuate hydraulic motor 146 to cause the gates 145 to rise so that the tubing will drop into the bin 144 for disposal.

In accordance with the provisions of the patent statutes, I have explained the principle and operation of my invention and have illustrated and described what I consider to represent the best embodiment thereof. However, I desire to have it understood that within the scope of the appended claims the invention may be practiced otherwise than as specifically illustrated and described.

I claim:

1. Continuous tube testing apparatus comprising a frame having a head stock and a longitudinally adjustable tail stock mounted thereon, a loading table, a rotatable head mounted on each of said head and tail stocks having a plurality of openings therein, said openings in one head being in line with and on the same axis as said openings in the other, means for rotating said heads, adjustable means for removing tubes in sequence from said table in timed relationship with the rotation of and for placing each of said tubes between said rotatable heads so that regardless of the tube diameter the longitudinal axis of each tube will coincide with that of an opening in each of said heads, said adjusting means comprising two members having tube receiving notches at the edges thereof disposed adjacent to one another, means for rotating one of said members with respect to the other thereby to vary the size of the effective notches formed by the adjacent members, means for sealing the ends of each tube at the edges thereof to prevent leakage between said two rotatable heads and said tube, separate valves connected to a source of fluid under pressure and to each of said openings in said head stock rotatable head, means adapted to open each of said valves in sequence as said heads are rotated to admit fluid to and for the pressure testing of each of said tubes and for closing said valves on the completion of said tests, and means for releasing and ejecting each of said tubes positioned between said heads following the testing thereof.

2. Continuous tube testing apparatus comprising a frame having a head stock and a longitudinally adjustable tail stock mounted thereon, a loading table, a rotatable head mounted on each of said head and tail stocks having a plurality of openings therein, said openings in one head being in line with and on the same axis as said openings in the other, means for rotating said heads, means for removing tubes in sequence from said table in timed relationship with the rotation of and for placing each of said tubes between said rotatable heads, and for insuring that the longitudinal axis of each tube without regard to diameter thereof will coincide with that of an opening in each of said heads, said means comprising pairs of members having tube receiving notches at the edges thereof and the members of each pair being disposed adjacent to one another, means connecting each pair of said members together and permitting limited rotation of one with respect to the other whereby the size of the effective notches formed by adjacent members may be varied, means for sealing the ends of said tubes at the edges thereof to prevent leakage between said two rotatable heads and said tubes, means connected to a source of fluid under pressure and to each of said openings in said head stock rotatable head, means adapted to pass fluid through said last-mentioned means for pressure testing each of said tubes and for obstructing the flow thereof on completion of said tests, and means for releasing and ejecting each of said tubes positioned between said heads following the testing thereof.

3. In a continuous tube testing apparatus a pair of rotatable heads having a plurality of openings therein, the openings of one head being in line with and on the same longitudinal axis as the openings in the other, adjustable means for inserting tubes in sequence between said heads for insuring that the longitudinal axis of each tube without regard to diameter thereof will coincide with that of the openings in said heads, said adjustable means comprising pairs of adjacent members having tube receiving notches at the edges thereof, means connecting said members together and permitting limited rotation of one with respect to the other whereby the size of the effective notches formed by adjacent members may be varied, means for sealing the ends of said tubes at the edges thereof to prevent leakage between said heads and said tubes, means for admitting fluid at a predetermined pressure to said tubes for effecting the testing thereof and means for releasing and ejecting said tubes in sequence from between said heads on the completion of said test.

4. In a continuous tube testing apparatus a pair of rotatable heads having a plurality of openings therein, the openings of one head being in line with and on the same longitudinal axis as the openings in the other, means for adjusting one head in an axial direction relative to the other, adjustable means for inserting tubes in sequence without regard to diameter thereof between and in line with a pair of openings in said heads, said adjustable means comprising a plurality of pairs of circular members, each pair having tube receiving notches at the edges thereof, locking means connecting each pair of said members together and permitting limited rotation of one with respect to the other whereby the size of the effective tube receiving notches formed by each pair of members may be varied means for sealing the ends of said tubes at the edges thereof to prevent leakage between said heads and said tubes, means for admitting fluid at a predetermined pressure to said tubes for effecting the testing thereof and means for releasing and ejecting said tubes in sequence from between said heads on the completion of said test.

5. In a continuous tube testing apparatus a pair of rotatable heads having a plurality of openings therein, the openings of one being in line with and on the same longitudinal axis as the openings in the other, means for adjusting one head in an axial direction relative to the other, adjustable means for inserting tubes in sequence without regard to diameter thereof between and in line with a pair of openings in said heads, said adjustable means comprising a plurality of pairs of circular members, each pair having tube receiving notches at the edges thereof, adjustable locking means for each pair of members permitting limited rotation of one member with respect to the other whereby the size of the effective tube receiving notches formed by each pair of members may be varied, sealing means comprising an axially movable member mounted in one of said heads for engaging with and compressing each tube between said heads for preventing leakage between said tubes and said heads, means for rotating said heads, means for admitting fluid at a predetermined pressure to each of said tubes for effecting the testing thereof, means for purging air from each of said tubes during the filling thereof, and means for releasing and ejecting said tubes in sequence from between said heads on the completion of said test.

6. In a continuous tube testing apparatus a pair of rotatable heads having a plurality of openings therein, the openings of one being in line with and on the same longitudinal axis as the openings in the other adjustable means for positioning tubes to be tested in sequence without regard to diameter thereof between and in line with a pair of openings in said heads, said adjustable means comprising a plurality of pairs of circular members, each pair having tube receiving notches at the edges thereof, adjustable locking means for each pair of members permitting limited rotation of one member with respect to the other whereby the size of the effective tube receiving notches formed by each pair of members may be varied, means for adjusting one head in an axial direction relative to the other, sealing means comprising an axially movable member mounted in one of said heads for engaging with and compressing each of said tubes between said heads for preventing leakage between said tubes and said heads, means for rotating said heads, a separate valve connected to a source of hydraulic fluid under pressure and with each of said openings in one of said heads, cam means for operating said valves to admit fluid at a predetermined pressure for the pressure testing of each of said tubes and to effect closure of said valves on completion of the test, and means for releasing and ejecting said tubes in sequence from between said heads.

7. In a continuous tube testing apparatus a pair of rotatable heads having a plurality of openings therein, the openings of one being in line with and on the same longitudinal axis as the openings in the other, adjustable means for positioning tubes to be tested in sequence without regard to diameter thereof between and in line with a pair of openings in said heads, said adjustable means comprising a plurality of pairs of circular members, each pair having tube receiving notches at the edges thereof, adjustable locking means for each pair of members permitting limited rotation of one member with respect to the other whereby the size of the effective tube receiving notches formed by each pair of members may be varied, means for adjusting one head in an axial direction relative to the other, sealing means comprising an axially movable member mounted in one of said heads for engaging with and compressing each of said tubes between said heads for preventing leakage between said tubes and said heads, means for rotating said heads, a separate valve connected to a source of hydraulic fluid under pressure and with each of said openings in one of said heads, cam means for operating said valves to admit fluid at a predetermined pressure for the pressure testing of each of said tubes and to effect closure of said valves on completion of the test, means for purging air from each of said tubes during the filling thereof, and means for releasing and ejecting said tubes in sequence from between said heads.

8. Continuous tube testing apparatus comprising a frame having a head stock and a longitudinally adjustable tail stock mounted thereon, a loading table, a rotatable head mounted on each of said head and tail stocks having a plurality of openings therein, said openings in one head being in line with and on the same axis as said openings in the other, means for rotating said heads, adjustable means for removing tubes in sequence from said table in timed relationship with the rotation of and for placing each of said tubes between said rotatable heads, the longitudinal axis of each tube coinciding with that of an opening in each of said heads, said adjustable means comprising a plurality of pairs of circular members, each pair having tube receiving notches at the edges thereof, adjustable locking means for each pair of members permitting limited rotation of one member with respect to the other whereby the size of the effective tube receiving notches formed by each pair of members may be varied, a plurality of yieldable continuous cables for engaging with and firmly pressing said tubes against said last mentioned means in gripping relationship, means for sealing the ends of each tube at the edges thereof to prevent leakage between said two rotatable heads and said tube, a plurality of valves connected to a source of fluid under pressure with each one thereof connected to a separate opening in said head stock rotatable head, means for opening each of said valves in sequence as said heads are rotated to admit fluid to and for the pressure testing of each of said tubes and for closing said valves on the completion of said tests, and means for releasing and ejecting each of said tubes positioned between said heads following the testing thereof.

HERMAN E. GRAU.

REFERENCES CITED

The following references are of record in the file of this patent:

UNITED STATES PATENTS

| Number | Name | Date |
|---|---|---|
| 779,719 | Kruse | Jan. 10, 1905 |
| 1,613,150 | Zore | Jan. 4, 1927 |
| 2,017,393 | Boax et al. | Oct. 15, 1935 |
| 2,242,658 | Protin | May 20, 1941 |

FOREIGN PATENTS

| Number | Country | Date |
|---|---|---|
| 401,621 | Great Britain | Nov. 16, 1933 |